United States Patent
Chang

(10) Patent No.: US 6,496,603 B1
(45) Date of Patent: Dec. 17, 2002

(54) ENHANCED ERROR DIFFUSION BY USING DIRECTIONAL GUIDED LINE THRESHOLDING

(75) Inventor: Chingwei Chang, Vancouver, WA (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

(21) Appl. No.: 09/246,263

(22) Filed: Feb. 8, 1999

(51) Int. Cl.[7] .............................. H04N 1/40; G06K 9/46
(52) U.S. Cl. ............................... 382/252; 358/3.2
(58) Field of Search ............................. 382/251–253, 382/237; 358/465, 1.9, 3.14, 3.22, 3.04, 3.09, 3.2

(56) References Cited

U.S. PATENT DOCUMENTS

| | | | |
|---|---|---|---|
| 5,335,089 A | * 8/1994 | Xie et al. ................... 358/456 |
| 5,493,416 A | 2/1996 | Fan ............................ 358/447 |
| 5,535,019 A | 7/1996 | Eschbach .................. 358/456 |
| 5,594,839 A | * 1/1997 | Shu ............................ 358/1.9 |
| 5,611,022 A | 3/1997 | Estrada et al. ............. 395/109 |
| 5,627,659 A | 5/1997 | Kakutani ................... 358/443 |
| 5,692,109 A | 11/1997 | Shu ............................ 395/109 |
| 5,737,453 A | 4/1998 | Ostromoukhov ........... 382/275 |
| 5,739,917 A | 4/1998 | Shu et al. ................... 358/298 |
| 5,757,976 A | 5/1998 | Shu ............................ 382/252 |
| 5,805,724 A | 9/1998 | Metcalfe et al. ........... 382/176 |
| 5,809,177 A | * 9/1998 | Metcalfe et al. ........... 382/251 |
| 5,818,604 A | * 10/1998 | Delabstita et al. ......... 358/298 |
| 5,831,626 A | * 11/1998 | Sano et al. ................. 345/431 |
| 5,930,396 A | * 7/1999 | Fiala et al. ................. 382/237 |

* cited by examiner

Primary Examiner—Thomas D. Lee
Assistant Examiner—Stephen Brinich
(74) Attorney, Agent, or Firm—Marger Johnson & McCollom, PC

(57) ABSTRACT

A method for error diffusion in digital printing. The method selects a base threshold value for printing of digital data, determines an offset value, and then calculates at least two threshold values from the base threshold value and the offset value. The thresholds are applied to the image along directional guided threshold lines, with each set of lines for each color having a unique angle to the lines for the other colors. The error diffusion process does not result in objectionable artifacts.

8 Claims, 2 Drawing Sheets

ENHANCED ERROR DIFFUSION BY USING DIRECTIONAL GUIDED LINE THRESHOLDING

BACKGROUND OF THE INVENTION

1. Field of the Invention

This invention relates to error diffusion in printing, more particularly to error diffusion in color printing.

2. Background of the Invention

In digital printing, the output to the printing system that forms the necessary dots is binary, either ON or OFF. A comparison of the intended value to a threshold determines whether the output i s ON or OFF. For example, consider an 8-bit system with a range of possible values from 0–255. The threshold for ON or OFF is set to 127.5, or at the mid-point. Values above will be is turned ON, values below OFF.

However, the value given an ON dot will be 255, and OFF will be 0. Therefore, an error exists between the intended value and the printed value of the dot. For example, if a dot has an intended value of 200, it lies above the threshold and will be turned ON. Its printed value will be 255, so there is an error of +55 between its intended and printed values.

This error is typically handled with error diffusion, originally proposed by Floyd and Steinberg. The error value can be assigned to the next dot, since the dots are so relatively small in the perceived human eye response; the eye will tend to integrate the next several dots into one larger spot of color. Floyd and Steinberg suggested using four yet to be processed pixels that neighbor the pixel with the error value.

The Floyd-Steinberg approach 10 is shown in FIG. 1. The threshold is applied to the input color value, which in this example is 200. The threshold is 128, so that dot is printed. The resulting difference between the intended value of 200 and the printed value is +55. It will be diffused to the neighbors with the weights of 7 5 3 1, in the positions shown at 14. The sum of the weights is 16, so the error valued ed=55/16=3.44. The following table demonstrates the result error diffusion on the neighboring pixels. The original value for all pixels is 144.

| Error weight | Error Value | Resulting Error | Original - Error | Result |
|---|---|---|---|---|
| 7 | 3.44 | 24 | 120 | 0 |
| 5 | 3.44 | 17 | 127 | 0 |
| 3 | 3.44 | 10 | 134 | 255 |
| 1 | 3.44 | 3 | 139 | 255 |

It must be understood that the error values computed for each pixel are only those from the previous pixel. Other error values exist for the pixels from other neighboring pixels. For example, if X in the below diagram is the pixel with value 200 from the example, Y is the neighboring pixel. The pixel that has the 5 weight from X is the pixel that has the 3 weight from Y. The error diffusion for X is in parentheses ( ), the error diffusion for Y in the brackets [ ].

|  |  | x | Y(7) | [7] |
|---|---|---|---|---|
| X error diffusion() | (3) | (5)[3] | (1)[5] | [1] |

As mentioned above, the flowchart for this process is shown in FIG. 1. One problem with this method of error processing is directional hysteresis because of the scan line format. The error diffusion can lead to objectionable artifacts in the image. A significant artifact is a texture pattern in the mid-tone region.

These artifacts are especially noticeable in the color printing area. A perceived colored pixel is actually an integrated image in the eye that takes four separate dots that are so close together that they are resolved as one. Some attempts have been made to layer the different color dots on top of each other, but these are not usually successful. The problem with layering the dots on top of each other is that the slightest slip in registration between the colors leads to further artifacts.

Several solutions to this problem have been proposed. The mid-tone patterns can be deconstructed. Instead of printing the dots on top of each other, the dots can be offset slightly from the centroid of the pixel position. The human eye resolves it as one pixel. Alternatively, a good relationship can be established between the four color dot positions relative to the centroid of the pixel. However, even these techniques can leave artifacts in the image, especially in the regions with values between 64 and 192.

Therefore, a new technique is needed for artifact correction in error diffusion for the mid-tone regions of print images.

SUMMARY OF THE INVENTION

One aspect of the invention is a method of error diffusion in printing that uses at least two thresholds applied along directional guided threshold lines. The priority to print a dot for any given color depends upon its relationship to the threshold for that position and that color. The thresholds for each color are established along a different direction from the other colors. The series of thresholds is then assigned to the lines in the proper direction for that color. The input color value is compared to the threshold for that position and the priority is determined.

In one embodiment of the invention, three threshold values are used. The four color threshold line orientations use these three thresholds to determine the printing priority for that color at each position.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
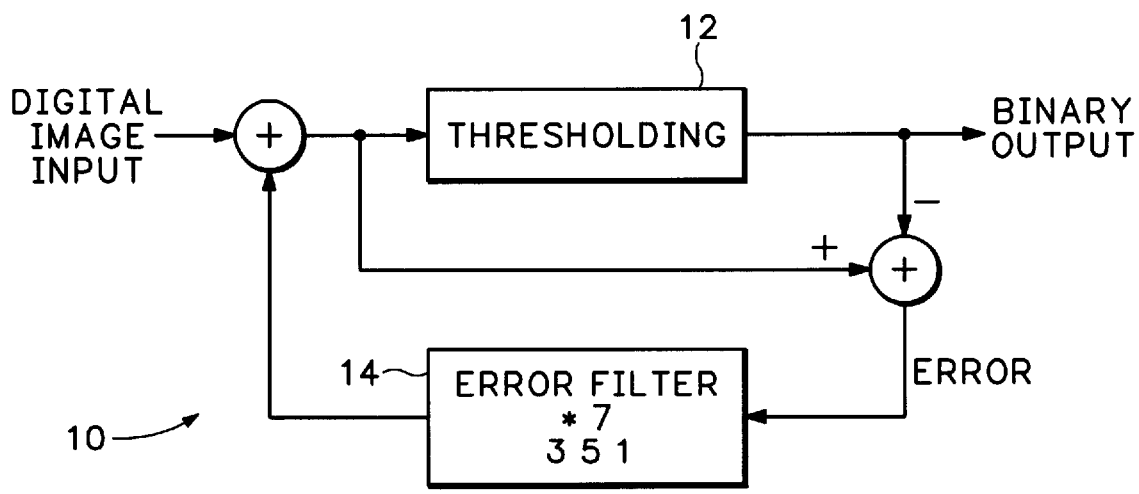
FIG. 1 shows a prior art embodiment of error diffusion.

Thresholding in digital printing is a necessity, so the artifacts resulting from it must be eliminated or reduced. Several solutions have been set forth in the area of error diffusion. The prior art approach towards error diffusion is shown in FIG. 1. This type of error diffusion results in objectionable artifacts, as previously discussed. However, techniques exist that allow the use of this type of error diffusion without resulting in the artifacts.

An example of such a technique will be discussed with reference to FIG. 2. Each block such as 18 is a pixel position for a printed pixel. These blocks represent only a portion of a page to be printed. Similarly, while there are four groups of threshold lines shown, each of three lines, these groups have lines that cover each pixel position, but are not shown in the interest of simplicity.

Each group of the threshold values Th1, Th2, Th3, is for a different color. For purposes of this discussion, the group oriented on the horizontal at 0° 28 will be black, the vertical group at 90° 26 will be yellow, the 45° group 24 will be cyan, and the 135° group 22 will be magenta. For purposes of this discussion, the threshold values will be set with Th1=Th2−a, Th2, and Th3=Th2+a. In experiments, a was set equal to 32, and Th2 equal to 128. Therefore, Th1=96, Th2=128, and Th3=160.

Figure 2:
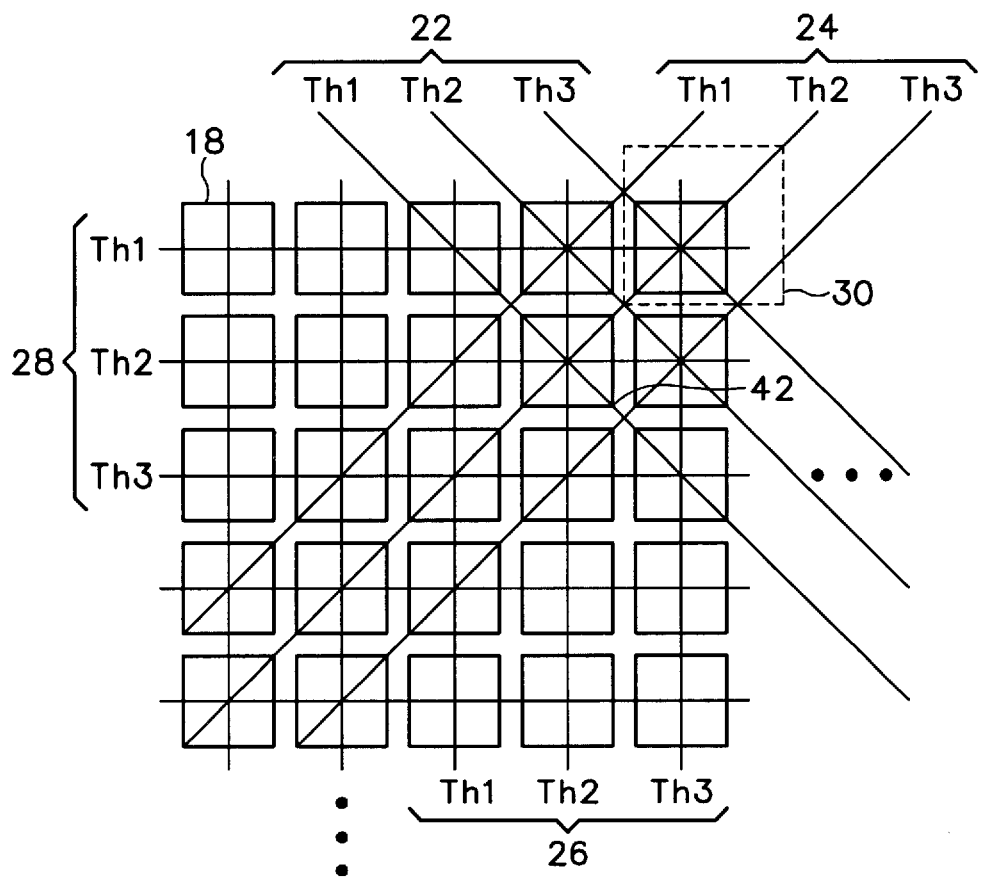
FIG. 2 shows a block diagram representation of pixel positions on a page with directional guided threshold lines.
Figure 3:
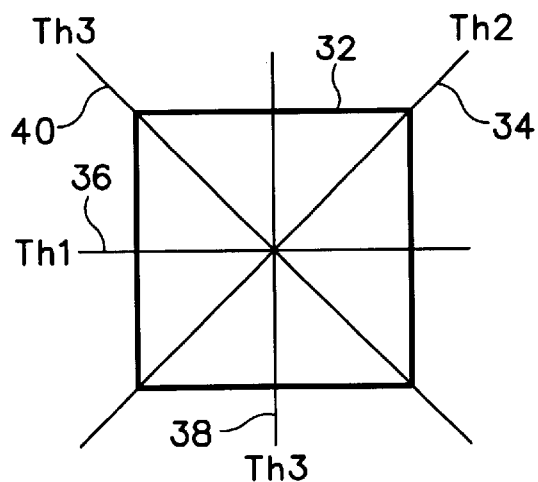
FIG. 3 shows a magnified view of one pixel position with its associated directional guided threshold lines.

The application of this type of directional guided line thresholding can be seen in more detail in FIG. 3. FIG. 3 is an exploded view of the area 30 in FIG. 2. The threshold lines 34, 36, 38 and 40 do not necessarily print the dots with priority on the lines indicated, they just indicate the orientation of the threshold line. Each color will have a unique angle to the other colors, relative to the image grid.

Referring to FIGS. 2 and 3, it can be seen that the horizontal black line 36 for that pixel position is on Th1, or 96. The vertical yellow line 38 for that pixel position is on Th3, or 160. The cyan line 34 is on Th2, or 128. The magenta line 40 is on Th3, or 160. As each color is printed, these thresholds will be used to determine if that color has a printing priority for that pixel. The printing priority is either set or not set, depending upon the value for that color for that particular pixel position.

For example, if the color input for the colors is shown below, with the respective thresholds, one can seen the resulting colors that are printed for that pixel position.

| Color | Color Input | Threshold Value | Priority | Error |
| --- | --- | --- | --- | --- |
| Cyan | 200 | 128 | Set | +55 |
| Magenta | 10 | 160 | No | −10 |
| Yellow | 20 | 160 | No | −20 |
| Black | 30 | 96 | No | −30 |

The error will be diffused according to the Floyd-Steinberg process. Referring to FIG. 2, it can be seen that the pixel position 42 will be the pixel position for the 3 weight of the error diffusion. However, because of the directional guided thresholding applied in this example, that pixel has different threshold lines for all colors but cyan. The position of the pixel is on the 45° line, which happens to correspond to cyan threshold Th2. However, the black threshold for that pixel is Th2, the yellow is Th2 and the magenta is Th1.

The changes in the threshold values for the neighboring pixels during error diffusion change the effects of the previously objectionable pattern. The current techniques use the same threshold and orientation for each color. By changing the thresholding for the colors based upon the position of the pixel receiving error diffusion, a pleasing pattern develops in the image. In small regions, a particular line pattern will develop, but it is not a distracting pattern and results in a pleasant artifact as opposed to an objectionable one.

Figure 4:
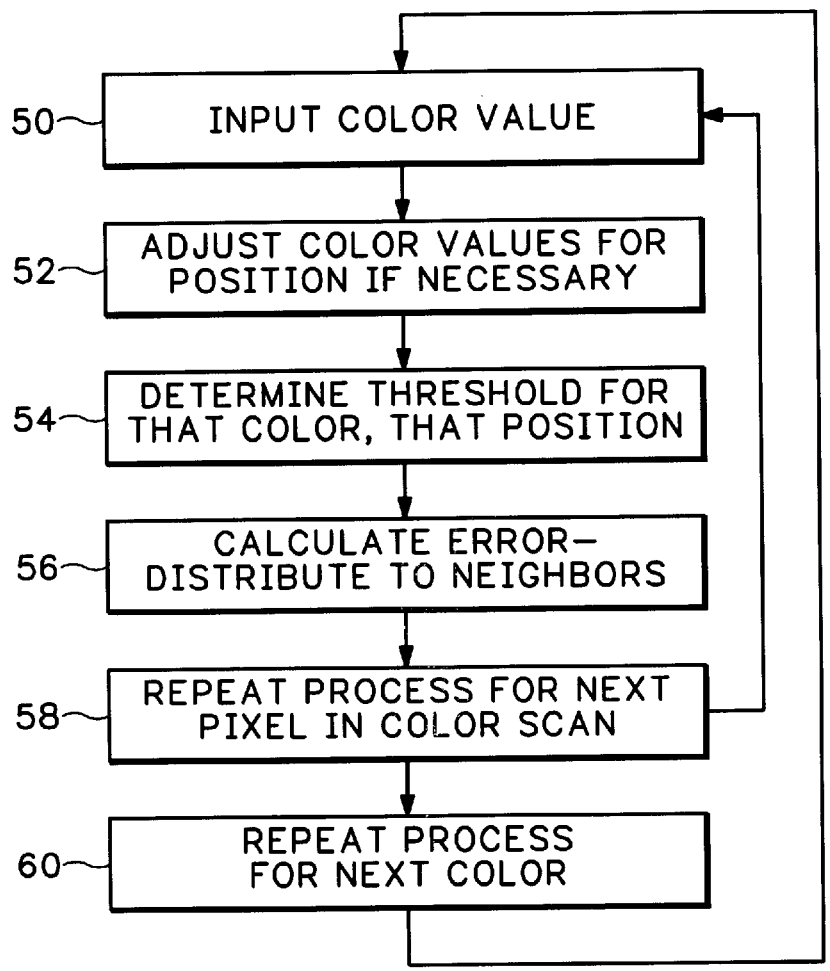
FIG. 4 shows a flow chart of one process of printing using directional guided threshold lines in accordance with the invention.

An overall process in accordance with the invention is shown in flowchart form in FIG. 4. The color value for a given color is received for a particular to pixel position at step 50. The color value is adjusted with any error diffused from neighbors if necessary at step 52, resulting in the actual color value. The threshold for that color is then applied at 54. The threshold depends upon which directional guided threshold line for that color the pixel position resides.

Once the threshold is determined for that position, it is applied to the is actual color input value at 56, the error is calculated and diffused and the printing priority is set. At 58, the process is then repeated for the next pixel in the color scan, if the color has pixels remaining to calculate. If not, the process starts over for the next color, unless values for all colors for all pixel positions have been determined.

After the completion of the process for the entire region or scan line, that segment of the image is then sent to the printer. Alternatively, the entire page could be completed and sent to the printer for printing.

What is claimed is:

1. A method for error diffusion, comprising the steps of:

selecting a base threshold color value for a pixel;

determining an offset color value;

calculating at least two threshold color values from said base threshold value and said offset value;

applying said at least two threshold color values to an image to be printed, such that said at least two threshold color values are applied in at least two directional guided threshold lines having an angle to said image to be printed;

repeating, said applying step as necessary for other colors, wherein said directional guided threshold lines have a unique angle for each color.

2. The method as claimed in claim 1, wherein said base sold is selected to be a color value of 128, where color values range from a minimum color value of 0 to a maximum color value of 255.

3. The method as claimed in claim 1, wherein said offset color value is determined to be a color value of 32, wherein color values range from a minimum color value of 0 to a maximum color value of 255.

4. The method as claimed in claim 1, wherein said at least two threshold offset values Fixer comprise two and only two threshold values.

5. The method as claimed in claim 1, wherein said at least two threshold color values is three threshold color values.

6. The method as claimed in claim 1, wherein said at least two angles further compromise two and only two angles.

7. The method as claimed in claim 1, wherein said at least two angles is three angles.

8. The method as claimed in claim 1, wherein applying said at least two threshold values to an image to be printed further comprises:

comparing a pixel color value of a pixel to be printed to one of the at least two threshold color values;

if the pixel color value is greater than the one of the at least two threshold color values, setting an actual pixel color value to the maximum color value;

if the pixel color value is less than the one of the at least two threshold color values, setting the actual pixel color value to zero; and diffusing, any error value between the pixel color value and the actual color value to neighboring pixels.

* * * * *

UNITED STATES PATENT AND TRADEMARK OFFICE
CERTIFICATE OF CORRECTION

PATENT NO.    : 6,496,603 B1
DATED         : December 17, 2002
INVENTOR(S)   : Chingwei Chang It is certified that error appears in the above-identified patent and that said Letters Patent is hereby corrected as shown below:

Column 1,
Line 15, "output i s ON" should read -- output is ON --;
Line 18, "be is turned" should read -- be turned --;

Column 4,
Line 8, "the is actual" should read -- the actual --;
Line 32, "repeating, said" should read -- repeating said --;
Line 36, "sold" should read -- threshold --;
Line 36, "where" should read -- wherein --;
Line 44, "Fixer" should read -- further --;
Line 49, "compromise" should read -- comprise --;
Line 64, "diffusing, any" should read -- diffusing any --.

Signed and Sealed this

Twenty-third Day of December, 2003

JAMES E. ROGAN
*Director of the United States Patent and Trademark Office*